US012327843B2

(12) United States Patent
Hwang

(10) Patent No.: US 12,327,843 B2
(45) Date of Patent: Jun. 10, 2025

(54) AUTOMATIC ID ASSIGNMENT SYSTEM AND METHOD FOR BATTERY MODULE

(71) Applicant: LG Energy Solution, Ltd., Seoul (KR)

(72) Inventor: Ji Won Hwang, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 814 days.

(21) Appl. No.: 17/628,772

(22) PCT Filed: Jul. 1, 2020

(86) PCT No.: PCT/KR2020/008559
§ 371 (c)(1),
(2) Date: Jan. 20, 2022

(87) PCT Pub. No.: WO2021/025297
PCT Pub. Date: Feb. 11, 2021

(65) Prior Publication Data

US 2022/0278379 A1 Sep. 1, 2022

(30) Foreign Application Priority Data

Aug. 5, 2019 (KR) ........................ 10-2019-0095019

(51) Int. Cl.
*H01M 10/46* (2006.01)
*H01M 10/42* (2006.01)
*H01M 10/48* (2006.01)

(52) U.S. Cl.
CPC ... *H01M 10/4221* (2013.01); *H01M 10/4207* (2013.01); *H01M 10/425* (2013.01);
(Continued)

(58) Field of Classification Search
CPC .. H02J 7/0042; H02J 7/0044; H01M 10/4221; H01M 10/4207; H01M 10/482;
(Continued)

(56) References Cited

U.S. PATENT DOCUMENTS 6,446,680 B1 * 9/2002 Soehnlen ................ B67C 3/023 141/2
10,230,082 B2 * 3/2019 Choi .................... H01M 50/211
(Continued)

FOREIGN PATENT DOCUMENTS

CN 103718425 A 4/2014
CN 104377750 A 2/2015
(Continued)

OTHER PUBLICATIONS

Office Action issued on Sep. 28, 2023 in corresponding Chinese Patent Application No. 202080052916.5.
(Continued)

*Primary Examiner* — Edward Tso
(74) *Attorney, Agent, or Firm* — Morgan, Lewis & Bockius LLP

(57) ABSTRACT

A battery module, an upper-level battery management system (BMS), and an automatic identification (ID) assignment system of a battery module are provided. A battery module, configured to wirelessly communicate with an upper-level battery management system (BMS) and be inserted into at least one battery module mounting part formed in a battery rack, includes: a pressure detection unit provided on a predetermined surface part of the battery module, the pressure detection unit being configured to: detect a pressure applied to the predetermined surface part, and output a pressure value, a wireless communication unit configured to transmit a pressure detection signal including the pressure value to the upper-level BMS through wireless communication, and a control unit configured to set and register a received identification (ID) information as its own ID when the ID information automatically assigned from the upper-level BMS is received.

15 Claims, 8 Drawing Sheets

230
PRESSURE DETECTION UNIT
22
24
25 ID STORAGE UNIT
26 MODULE POSITION AUTOMATIC ADJUSTMENT UNIT
CONTROL UNIT
WIRELESS COMMUNICATION UNIT
21
NOTIFICATION UNIT
28

(52) U.S. Cl.
CPC .. *H01M 10/482* (2013.01); *H01M 2010/4271* (2013.01); *H01M 2010/4278* (2013.01)

(58) Field of Classification Search
CPC . H01M 2010/4271; H01M 2010/4278; H01M 10/42
USPC ................................ 320/107, 115, 116, 106
See application file for complete search history.

(56) References Cited

U.S. PATENT DOCUMENTS

| | | | |
|---|---|---|---|
| 2011/0175574 | A1 | 7/2011 | Sim et al. |
| 2014/0018990 | A1 | 1/2014 | Kataoka et al. |
| 2014/0091770 | A1 | 4/2014 | Lee et al. |
| 2014/0354291 | A1 | 12/2014 | Kikuchi et al. |
| 2015/0048779 | A1 | 2/2015 | Lee |
| 2015/0084598 | A1 | 3/2015 | Song |
| 2016/0118696 | A1 | 4/2016 | Ahn |
| 2017/0149101 | A1 | 5/2017 | Sakabe |
| 2018/0019506 | A1 | 1/2018 | Ahn |
| 2018/0149704 | A1 | 5/2018 | Yoon et al. |
| 2018/0269543 | A1 | 9/2018 | Kim et al. |
| 2018/0287218 | A1 | 10/2018 | Lim et al. |
| 2019/0207413 | A1 | 7/2019 | Ueno et al. |
| 2019/0260097 | A1 | 8/2019 | Kwon et al. |
| 2020/0036194 | A1 | 1/2020 | Park et al. |
| 2020/0176825 | A1 | 6/2020 | Park et al. |

FOREIGN PATENT DOCUMENTS

| | | | |
|---|---|---|---|
| CN | 104638718 | A | 5/2015 |
| CN | 106114275 | A | 11/2016 |
| CN | 106415974 | A | 2/2017 |
| CN | 107710006 | A | 2/2018 |
| CN | 109313238 | A | 2/2019 |
| CN | 109991901 | A | 7/2019 |
| CN | 110024207 | A | 7/2019 |
| JP | 2011-034964 | A | 2/2011 |
| JP | 2017-073213 | A | 4/2017 |
| KR | 10-1156342 | B1 | 6/2012 |
| KR | 10-2015-0033188 | A | 4/2015 |
| KR | 10-1542094 | B1 | 8/2015 |
| KR | 10-1597317 | B1 | 2/2016 |
| KR | 10-2016-0049309 | A | 5/2016 |
| KR | 10-2017-0051071 | A | 5/2017 |
| KR | 10-2017-0098451 | A | 8/2017 |
| KR | 10-2018-0049734 | A | 5/2018 |
| KR | 10-1854876 | B1 | 6/2018 |
| KR | 10-2018-0109519 | A | 10/2018 |
| KR | 10-2019-0011565 | A | 2/2019 |
| KR | 10-2019-0040414 | A | 4/2019 |
| WO | 2013/051157 | A1 | 4/2013 |
| WO | 2019/009531 | A1 | 1/2019 |

OTHER PUBLICATIONS

Extended European Search Report dated Sep. 15, 2022 issued by the European Patent Office in corresponding European Patent Application No. 20850843.2.

International Search Report issued in corresponding International Patent Application No. PCT/KR2020/008559 dated Sep. 28, 2020.

Office Action dated Mar. 13, 2023, issued in corresponding Japanese Patent Application No. 2022-507504.

* cited by examiner (a)

(b)

(a)

(b)

AUTOMATIC ID ASSIGNMENT SYSTEM AND METHOD FOR BATTERY MODULE

MUTUAL CITATIONS WITH RELATED APPLICATIONS

The present invention claims the benefit of priority based on Korean Patent Application No. 10-2019-0095019 filed on Aug. 5, 2019, and includes all contents disclosed in the literature of the Korean patent application as part of this specification.

TECHNICAL FIELD

The present invention relates to a system in which an upper-level BMS automatically assigns an ID to a lower-level BMS in the same battery rack.

BACKGROUND ART

Recently, research and development on secondary batteries have been actively conducted. Here, the secondary batteries, as batteries that can be charged and discharged, mean that they include conventional Ni/Cd batteries and Ni/MH batteries, and recent lithium ion batteries. Among the secondary batteries, the lithium ion battery has an advantage that the energy density is much higher than that of the conventional Ni/Cd battery and Ni/MH battery, and further, the lithium ion battery can be manufactured with a tendency of a small size so that it is used as a power source for a mobile apparatus. In addition, the usage range of the lithium ion battery extends as a power source for electric vehicles, so that the lithium ion battery attracts attention as a next generation energy storage medium.

In addition, a secondary battery is generally used as a battery pack including a battery module in which a plurality of battery cells are connected in series and/or in parallel. And, a state and an operation of a battery pack are managed and controlled by a battery management system (BMS).

A plurality of battery modules are connected in series/parallel to form a battery rack, and a plurality of battery racks are connected in parallel to form a battery bank. Such a battery bank can be used as an energy storage system (ESS). Each battery module is monitored and controlled by the corresponding lower-level BMS. The upper-level BMS, which is the top-level controller in each battery rack, monitors and controls each lower-level BMS, and monitors and controls the entire battery rack status based on information obtained from the lower-level BMS.

At this time, when the lower-level BMS and the upper-level BMS of multiple battery racks communicate with each other wirelessly in the same space, the signal may be transmitted to a battery rack other than the corresponding battery rack. Therefore, after the initial installation of the ESS, each upper-level BMS automatically identifies the lower-level BMS placed in the same battery rack, so that there is a problem that it is difficult to assign an ID to the lower-level BMS.

DISCLOSURE

Technical Problem

An object of the present invention is to automatically assign an ID of a lower-level BMS disposed in a corresponding battery rack by an upper-level BMS disposed in each battery rack in an ESS including a plurality of battery racks.

Technical Solution

According to an embodiment of the present invention, a battery module wirelessly communicates with an upper-level BMS and is inserted into at least one battery module mounting part formed in a battery rack, and includes: a pressure detection unit provided on a predetermined surface part of the battery module and configured to detect a pressure applied to the predetermined surface part and output a pressure value; a wireless communication unit configured to transmit a pressure detection signal including the pressure value to the upper-level BMS through wireless communication; and when ID information automatically assigned from the upper-level BMS is received, a control unit configured to set and register the received ID information as its own ID.

In the battery module according to an embodiment of the present invention, the pressure detection unit includes a pressure sensor that outputs different pressure values according to an area to which pressure is applied.

In the battery module according to an embodiment of the present invention, the pressure detection unit includes a plurality of pressure sensing means for outputting pressure values for a plurality of points to which pressure is applied, and a signal processing unit for outputting a series of digital signals by muxing the outputs from the plurality of pressure sensing means.

In the battery module according to an embodiment of the present invention, the predetermined surface part receives pressure from a pressure generation unit provided corresponding to a portion where the predetermined surface part contacts the battery module mounting part when the battery module is inserted and mounted in the battery module mounting part, wherein the pressure generation unit is provided with a different size or number for each of the battery module mounting part to apply a different pressure to each battery module.

In the battery module according to an embodiment of the present invention, the predetermined surface part is a bottom part of the battery module.

According to an embodiment of the present invention, an upper-level BMS wirelessly communicates with at least one battery module mounted in a battery rack, and includes: a control unit configured to identify a battery module that has transmitted a pressure detection signal including a pressure value, and automatically assign an ID to the identified battery module based on a reference pressure value corresponding to a battery module mounting part into which each of the battery modules are inserted; an ID information storage unit configured to store a reference pressure value for identifying the battery module and ID information that is automatically assigned in association with the reference pressure values; and an ID assignment information storage unit configured to store ID information that is automatically assigned to the battery module identified by the control unit.

In the upper-level BMS according to an embodiment of the present invention, the control unit identifies the battery module based on the reference pressure value stored in the ID information storage unit, and according to a result of comparing the pressure value included in the pressure detection signal and the reference pressure value stored in the ID information storage unit, if the pressure value does not fall within a predetermined range of the reference pressure value, determines that the identification of the battery module has failed, and notifies the battery module of ID assignment failure.

In the upper-level BMS according to an embodiment of the present invention, when the identification of the battery module fails, the control unit transmits a position adjustment command to the battery module, and terminates the ID assignment procedure for the battery module.

In the upper-level BMS according to an embodiment of the present invention, the reference pressure value is a value corresponding to a reference value for pressure applied by a pressure generation unit provided in the battery module mounting part, wherein in order to identify the battery module inserted into the battery module mounting part, the reference value is a different value for each of the pressure generation units provided in the battery module mounting part.

According to another embodiment of the present invention, an automatic ID assignment system of a battery module includes: a batter module including: a pressure detection unit provided on a predetermined surface part of a battery module and configured to detect a pressure applied to the predetermined surface part and output a pressure value; a wireless communication unit configured to transmit a pressure detection signal including the pressure value to the upper-level BMS through wireless communication; and when ID information automatically assigned from the upper-level BMS is received, a first control unit configured to set and register the received ID information as its own ID and inserted into a battery module mounting part formed in at least one battery rack; and an upper-level BMS configured to wirelessly communicate with the battery module and including: a second control unit configured to identify a battery module that has transmitted a pressure detection signal including a pressure value, and automatically assign an ID to the identified battery module based on a reference pressure value corresponding to a battery module mounting part into which each of the battery modules are inserted; an ID information storage unit configured to store a reference pressure value for identifying the battery module and ID information that is automatically assigned in association with the reference pressure values; and an ID assignment information storage unit configured to store ID information that is automatically assigned to the battery module identified by the control unit.

In the automatic ID assignment system according another embodiment of the present invention, the pressure detection unit includes a pressure sensor that outputs different pressure values according to an area to which pressure is applied.

In the automatic ID assignment system according another embodiment of the present invention, the pressure detection unit includes a plurality of pressure sensing means for outputting pressure values for a plurality of points to which pressure is applied, and a signal processing unit for outputting a series of digital signals by muxing the outputs from the plurality of pressure sensing means.

In the automatic ID assignment system according another embodiment of the present invention, the predetermined surface part receives pressure from a pressure generation unit provided corresponding to a portion where the predetermined surface part contacts the battery module mounting part when the battery module is inserted and mounted in the battery module mounting part, thereby outputting a pressure value corresponding thereto.

In the automatic ID assignment system according another embodiment of the present invention, the second control unit identifies the battery module based on the reference pressure value stored in the ID information storage unit, and according to a result of comparing the pressure value included in the pressure detection signal and the reference pressure value stored in the ID information storage unit, if the pressure value does not fall within a predetermined range of the reference pressure value, determines that the identification of the battery module has failed, and notifies the battery module of ID assignment failure.

In the automatic ID assignment system according another embodiment of the present invention, when the identification of the battery module fails, the second control unit transmits a position adjustment command to the battery module, and terminates the ID assignment procedure for the battery module.

The automatic ID allocation method of the battery module according to another embodiment of the present invention includes detecting a pressure applied to a predetermined surface portion, and transmitting a pressure detection signal including a pressure value corresponding to the pressure detected through wireless communication to an upper-level BMS in at least one battery module inserted into at least one battery module mounting part formed in the battery rack; identifying a battery module that has transmitted a pressure detection signal including a pressure value, and automatically assigning an ID to the identified battery module based on a reference pressure value corresponding to a battery module mounting part into which each of the battery modules are inserted in the upper-level BMS; storing ID information for the automatically assigned and identified battery module, and wirelessly communicating the automatically assigned ID information to the battery module; and setting and registering its own ID based on ID information automatically allocated from the upper-level BMS, and ending setting the ID in the battery module.

Advantageous Effects

According to embodiments of the invention, the upper-level BMS disposed in each battery rack in the ESS including a plurality of battery racks automatically assigns the ID of the lower-level BMS arranged in the corresponding battery rack, thereby enabling efficient management of the ESS.

BEST MODE

Figure 1:
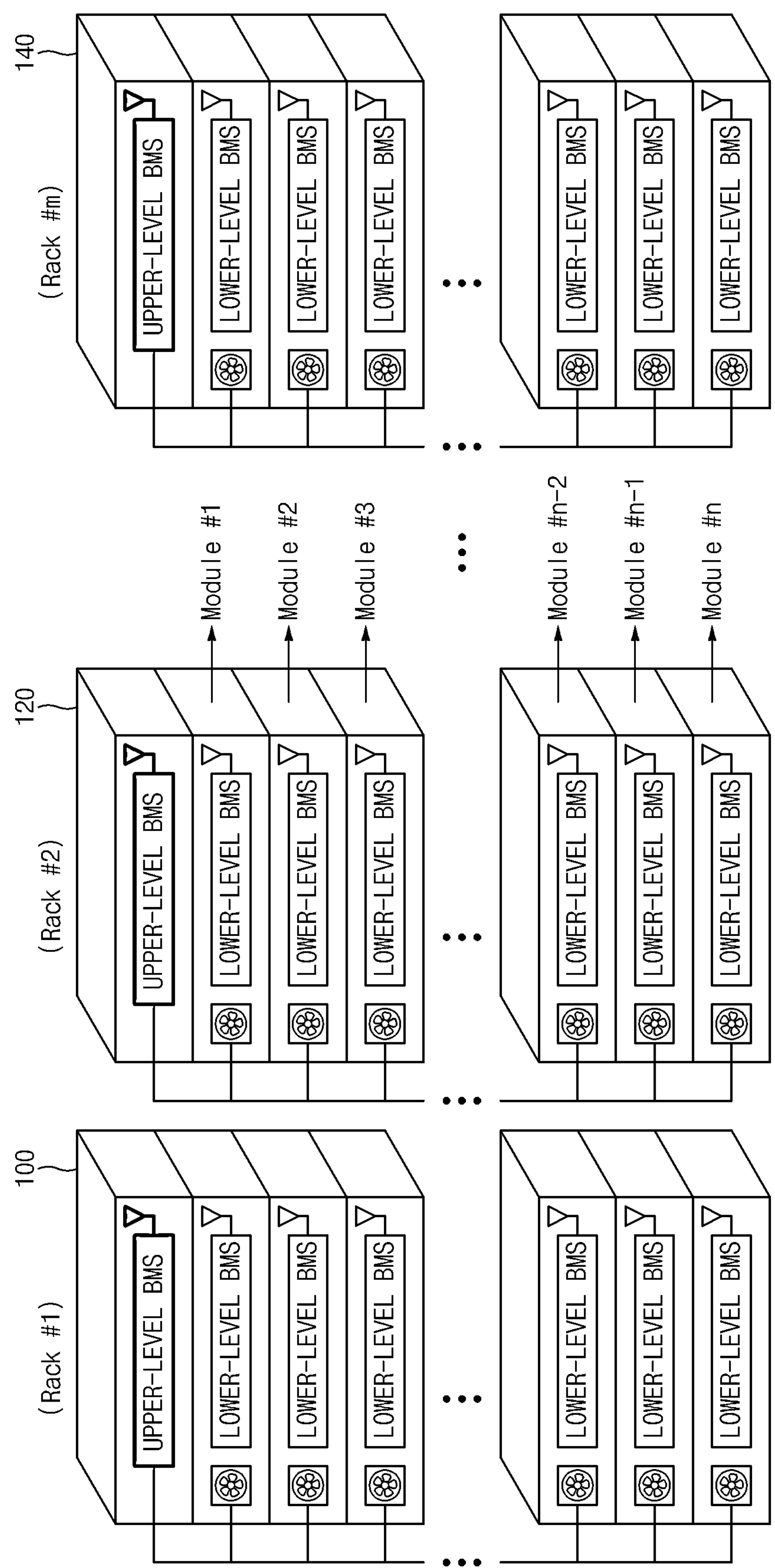
FIG. 1 schematically illustrates a configuration of a plurality of battery racks in an ESS in relation to an embodiment of the present invention.

Hereinafter, various embodiments of the present invention are disclosed with reference to the accompanying drawings. However, this is not intended to limit the invention to the specific embodiments, and it is to be understood that the invention includes various modifications, equivalents, and/or alternatives. With respect to the descriptions of the drawings, like reference numerals refer to like elements.

Terms used in various embodiments of the present disclosure are used to describe specific embodiments of the present disclosure, and are not intended to limit the scope of other embodiments. The terms of a singular form may include plural forms unless they have a clearly different meaning in the context. Otherwise indicated herein, all the terms used herein, which include technical or scientific terms, may have the same meaning that is generally understood by a person skilled in the art. In general, the terms defined in the dictionary should be considered to have the same meaning as the contextual meaning of the related art, and, unless clearly defined herein, should not be understood as having an ideal or excessively formal meaning. In any cases, even the terms defined in this specification cannot be interpreted as excluding embodiments of the present invention.

In addition, in describing the components of the embodiment of the present invention, terms such as first, second, A, B, (a), and (b) may be used. These terms are only to distinguish the components from other components, and the nature, sequence, or order of the components are not limited by the terms. In addition, when a component is described as being "connected to", "coupled to" or "linked to" another component, the components may be directly connected to or linked to each other but it should be understood that other components may be "connected", "coupled", or "linked" between each component.

FIG. 1 briefly shows the configuration of a plurality of battery racks 100 to 140 in the ESS.

The ESS includes a plurality of battery racks. Each battery rack includes a plurality of battery modules connected in series and/or parallel. Each battery module is monitored and controlled by each lower-level BMS.

In this way, when a plurality of battery racks are included in one ESS, and wirelessly communicates between the upper-level BMS and the lower-level BMS in the battery rack, since wireless communication can be performed between the upper-level BMS in the battery rack and the lower-level BMS in the other battery rack, after the ESS is initially installed, it is difficult to identify the lower-level BMS where each upper-level BMS is located in the same battery rack. Therefore, in the related art, when initially installing the ESS, the installer had to manually input ID information to each lower-level BMS or install the modules in a predetermined order. In this case, there was a problem that a mistake may occur in the installation process, and it may take more time to install. An automatic ID assignment system and method for a battery module according to an embodiment of the present invention for solving this problem will be described later.

Figure 2:
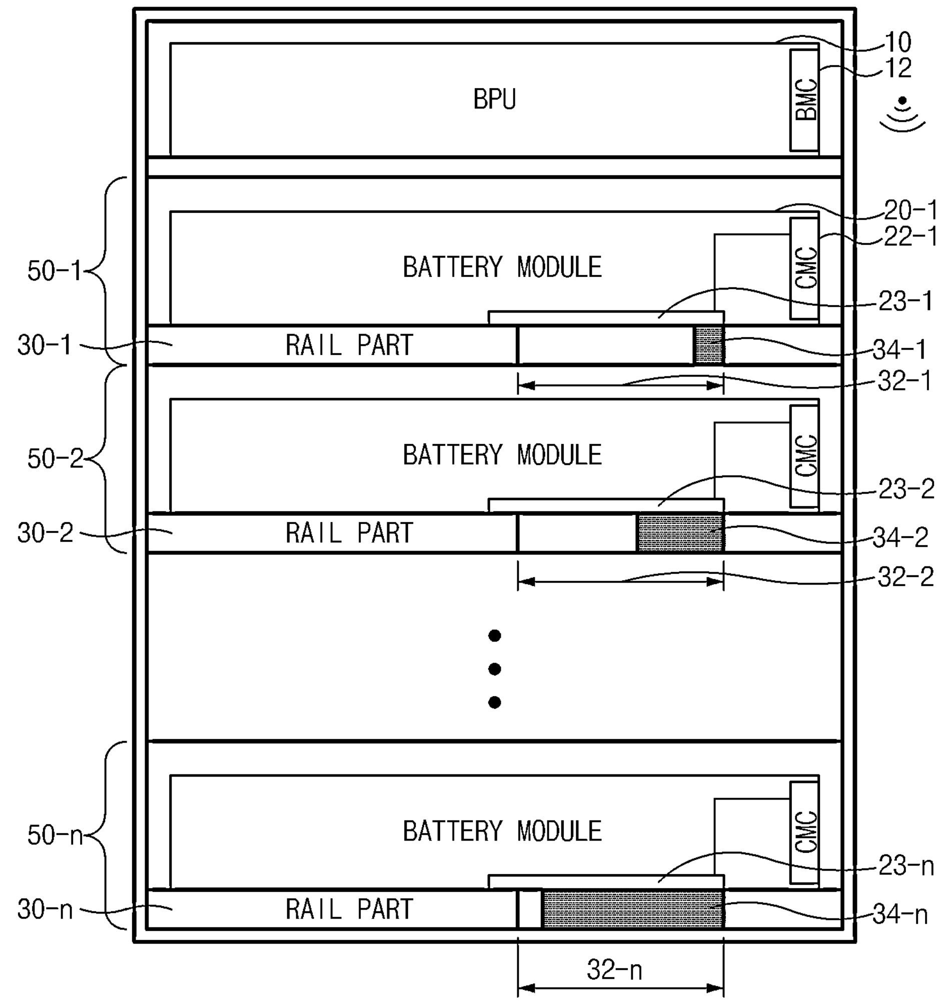
FIG. 2 is a side view of a battery rack briefly showing the installation state of an upper-level BMS (BMC) and a lower-level BMS (CMC) according to an embodiment of the present invention.

FIG. 2 is a side view of a battery rack briefly showing the installation state of an upper-level BMS (BMC 10) and a lower-level BMS (CMC 22) according to an embodiment of the present invention. In an embodiment of the present invention, the lower-level BMS is included in the battery module, and the upper-level BMS that monitors and controls the entire battery rack status based on the information obtained from the lower-level BMS is illustrated as being included in the battery power unit (BPU), but this is illustrative and not restrictive.

At least one of battery module mounting parts 50-1 to **50-*n* is formed in the battery rack, and rail parts 30-1 to 30-*n* are provided below the battery module mounting parts 50-1 to 50-*n*, so that when each of the battery module 20-1 to 20-*n* is inserted into the battery module mounting parts 50-1 to 50-*n*, it is stably fitted with the help of the rail parts 30-1 to 30-*n***.

Pressure generation units 34-1 to **34-*n* are provided in a predetermined area of the rail parts 30-1 to 30-*n*, and at the bottom of the battery modules 20-1 to 20-*n*, sensors 23-1 to 23-*n* are provided to detect the pressure exerted by the pressure generation units 34-1 to 34-*n*, and when battery modules 20-1 to 20-*n* are properly inserted and installed, these sensors 23-1 to 23-*n* are placed in a position to detect pressure applied from the pressure generation units 34-1 to 34-*n* in contact with the pressure generation units 34-1 to 34-*n***.

The sensors 23-1 to **23-*n* may be pressure sensors that output a predetermined pressure value according to pressure detection by changing the resistance according to the pressure applied by the pressure generation units 34-1 to 34-*n*, and the pressure generation units 34-1 to 34-*n* may be provided in different sizes within each battery module mounting parts 50-1 to 50-*n*, as shown in FIG. 2. In this case, since the pressure applied depends on the size of the pressure generation units 34-1 to 34-*n*, the sensors 23-1 to 23-*n* will output a pressure value of a size that can be associated with the battery module mounting parts 50-1 to 50-*n*, so that this pressure value allows identification of which battery mounting parts 50-1 to 50-*n* the battery modules 20-1 to 20-*n* are inserted into. The sensors 23-1 to 23-*n*** may utilize a force sensitive resistor (FRS) or the like.

A configuration example of the pressure detection unit 230 including the pressure generation units 34-1 to **34-*n* and the sensors 23-1 to 23-*n* will be described with reference to FIGS. 3 to 5** below.

In addition, the battery modules 20-1 to **20-*n*, the CMC 22-1 to 22-*n*, the sensors 23-1 to 23-*n*, the rail parts 30-1 to 30-*n*, the pressure generation unit formation areas 32-1 to 32-*n*, the pressure generation units 34-1 to 34-*n*, and the battery module mounting parts 50-1 to 50-*n*, shown in FIG. 2, are briefly described as the battery module 20, the CMC 22, the sensor 23, the rail part 30, the pressure generation unit formation area 32, the pressure generation unit 34, and battery module mounting parts 50** except the case where it is necessary to specify each battery module in the battery rack. For the function of each component, a portion directly related to the automatic IP assignment function of the battery module according to an embodiment of the present invention will be mainly described.

Meanwhile, the BMC 12 of the BPU 10 shown in FIG. 2 communicates wirelessly with the CMC 22 of the battery module 20 to monitor and control the state of the entire battery module. The BMC 12 manages a unique ID for identifying each CMC 22 for wireless communication with each CMC 22. And, especially in the embodiments of the present invention, when a pressure detection signal including a pressure value is received from each CMC 22, based on the pressure value, the BMC 12 performs a function of automatically assigning an ID in connection with the installation location of the battery module 20 equipped with the CMC 22.

Figure 3:
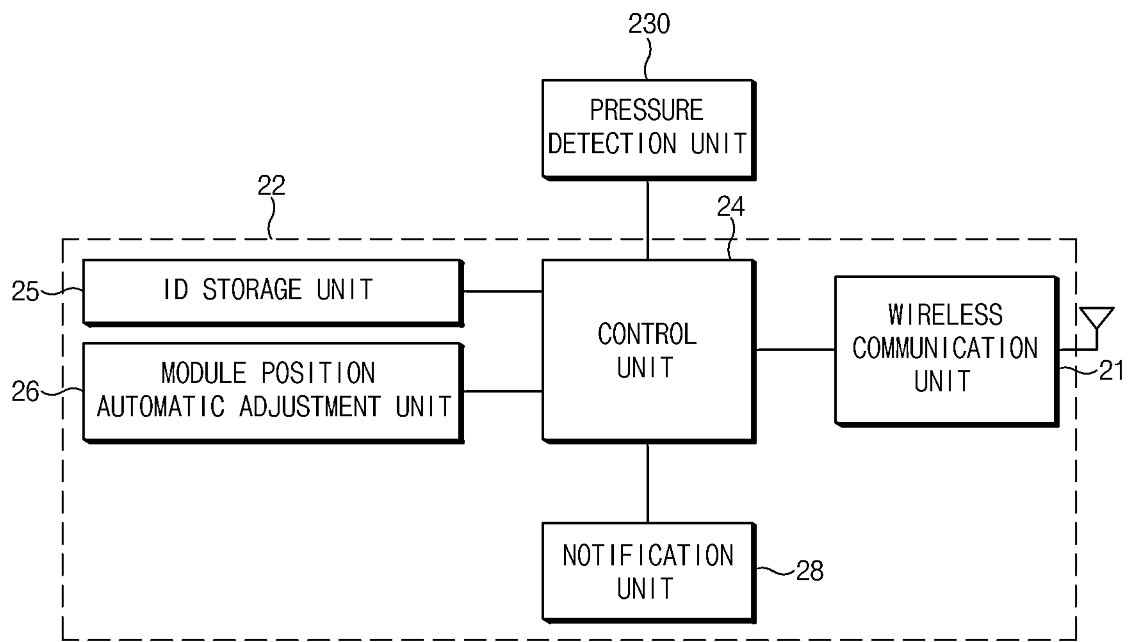
FIG. 3 is a main block diagram of a lower-level BMS according to an embodiment of the present invention.
Figure 4:
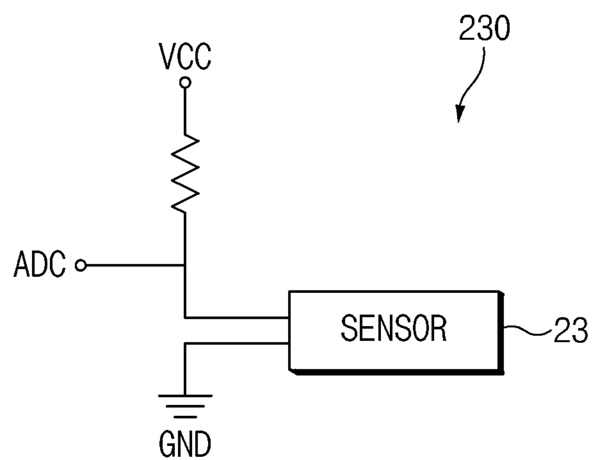
FIG. 4(*a*) is an example of a configuration of the pressure detection unit shown in FIG. 3, and FIG. 4(*b*) is a view showing an example of a configuration of a pressure generation unit provided in a battery rack.
Figure 4:
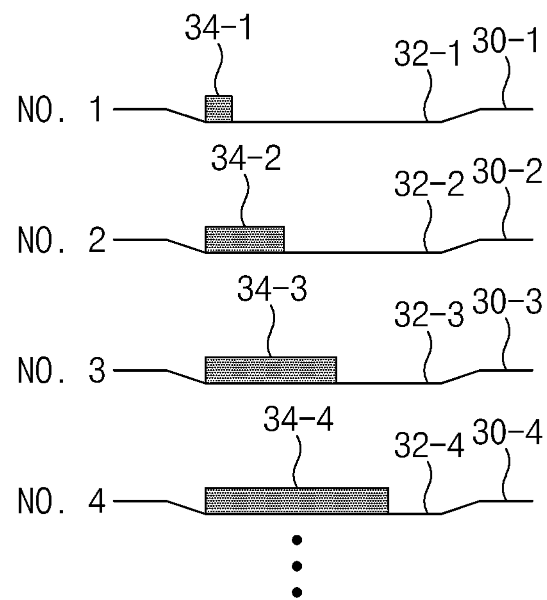

Next, FIG. 3 is a main block diagram of the CMC 22 according to an embodiment of the present invention, FIG. 4(*a*) is an example of a configuration of the pressure detection unit shown in FIG. 3, and FIG. 4(*b*) is a view showing an example of a configuration of a pressure generation unit provided in a battery rack.

First, referring to FIG. 3, the CMC 22 includes a wireless communication unit 21 for transmitting and receiving signals with the wireless communication unit 14 of the BMC 12 (see FIG. 6) in a wireless communication method such as Wi-Fi, ZigBee, or Bluetooth, a control unit 24 for transmitting a pressure detection signal to the BMC 12 through the wireless communication units 14 and 21 to perform a series of control operations for automatically assigning an ID from the BMC 12, and an ID storage unit 25 for registering and setting the ID assigned by the BMC 12 under the control of the control unit 24 and manages it. In addition, the CMC 22 may additionally include a module position automatic adjustment unit 26 for adjusting the position of the battery module 20 through the rail part 30 under the control of the control unit 24 according to the position adjustment command transmitted from the BMC 12 when recognition of the battery module has failed, and a notification unit 28 for warning a failure of the recognition of the battery module 20 under the control of the control unit 24 according to the position adjustment command. In an embodiment of the present invention, the notification unit 28 may employ a buzzer or an announce device, a warning lamp, or the like, capable of giving a visual or audible warning.

Meanwhile, the pressure detection unit 230 is provided on a predetermined surface part of the battery module 20, for example, a bottom part, as shown in FIG. 2, and includes the sensor 23, for example, a pressure sensor in which the resistance value is changed by the pressure applied by the pressure generation unit 34 of the rail part 30, and outputs the pressure detection signal corresponding to the corresponding resistance value to the control unit 24.

Figure 5:
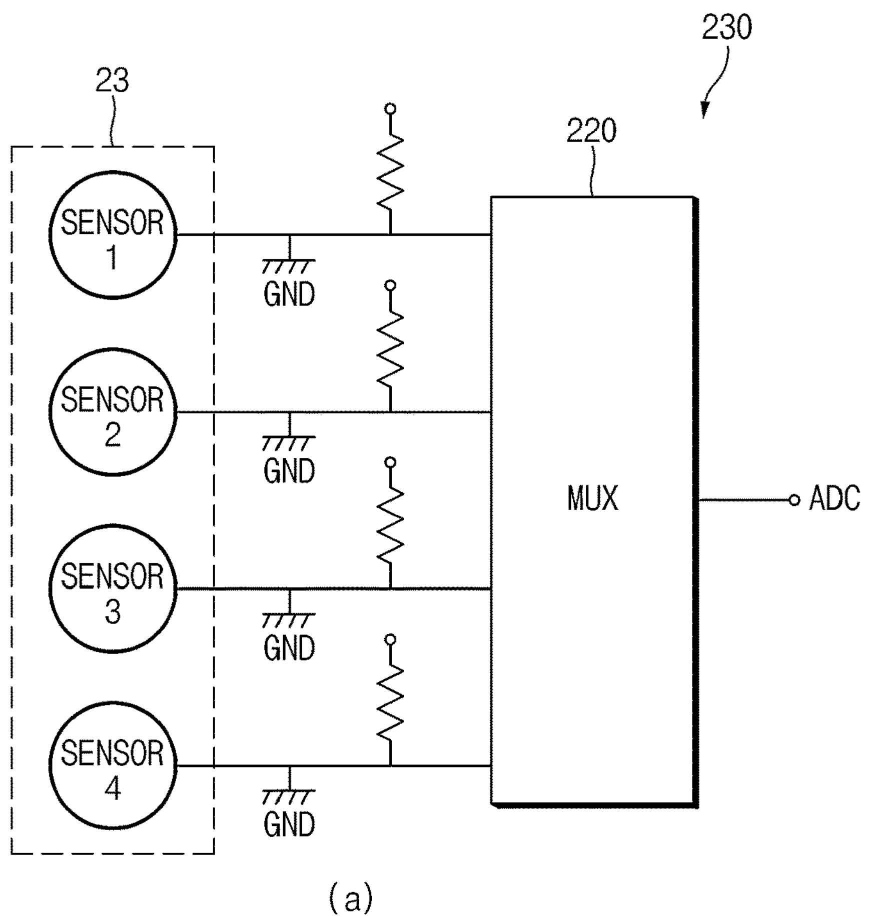
FIG. 5(*a*) is another example of a configuration of the pressure detection unit shown in FIG. 3, and FIG. 5(*b*) is a view showing another example of a configuration of a pressure generation unit provided in a battery rack.
Figure 5:
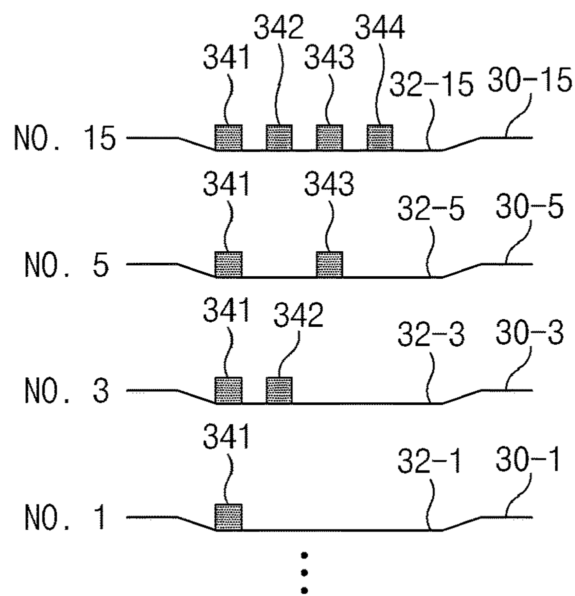

The pressure detection unit 230 may be configured as shown in FIG. 4(*a*) or FIG. 5(*a*).

Referring to FIG. 4(*a*), the pressure detection unit 230 is provided with the sensor 23 which is a pressure sensor whose resistance value varies according to an area to which pressure is applied by the pressure generation unit 34, and the analog value outputted according to the resistance value of the pressure sensor is inputted to the A/D converter through the ADC terminal and outputted as a digital value.

In this case, the pressure generation unit 34 is preferably configured as shown in FIG. 4(*b*).

That is, the pressure generation unit formation area 32 is formed in the rail part 3 provided in each battery module mounting parts 50, for example, in a concave shape, and in order to apply a specific pressure to the sensor 23 so as to specify the installation position of the battery module in connection with each battery module mounting parts 50 in the pressure generation unit formation area 32, different sizes of the pressure generation units 34-1 to 34-4 are formed for the respective battery module mounting parts 50-1 to 50-4. Nos. 1, 2, 3, and 4 described on the left side of FIG. 4(*b*) indicate the numbers of the battery module mounting parts 50, and as shown in the same drawing, it is preferable that a pressure generation unit 34 of a different size is provided for each battery module mounting parts 50.

According to the configuration of FIG. 4, when the battery module 20 is inserted into the battery module mounting parts 50, the pressure detection unit 230 outputs a pressure value corresponding to the pressure applied by the area of each size of the pressure generation units 34-1 to 34-4. This pressure value will preferably vary depending on the battery module mounting parts 50 into which the battery module 20 is inserted.

Meanwhile, another configuration example of the pressure detection unit 230 will be described with reference to FIG. 5(*a*).

According to FIG. 5(*a*), as in the configuration example of FIG. 4, the sensor 23 is provided in the bottom part of the battery module 20, but in order to detect the pressure of a plurality of points applied by the plurality of pressure generation units 341 to 344 formed as shown in FIG. 5(*b*), a plurality of sensors 1 to 4 may be configured in positions corresponding to the positions of the respective pressure generation unit 341 to 344. The sensor to sensor 4 may be piezo sensors. The number of the sensors 1 to 4 may vary depending on the number of pressure generation units, and the number of pressure generation units may be determined according to the number of battery module mounting parts 50. When it is composed of four as shown in FIG. 5(*b*), it is possible to correspond to the binary number 1000 (No. 1) to 1111 (No. 15), so that up to 15 ($2^4-1$) battery module mounting parts can be distinguished. Likewise, if five pressure generation units 341 to 345 are formed in the pressure generation unit formation area 32, up to 31 ($2^5-1$) of battery module mounting parts 50 can be distinguished. Here, distinguishing the battery module mounting parts 50 may be used as synonymous with distinguishing the battery module.

According to FIG. 5(*b*), in a structure in which pressure generation units 341 to 344 can be formed at 4 points, when all pressure generation units 341 to 344 are formed at 4 points, the pressure generation units 341 to 344 are sensed by the sensors 1 to 4, and the corresponding current value is applied to the MUX 220, so that the pressure value corresponding to '1111' is outputted from the MUX 220 and is identified as '15'. If the pressure generation units 341 and 343 are formed at 4 points, the pressure generation units 341 and 343 are sensed by the sensors 1 and 3, and corresponding current values are applied to the MUX 220, so that the pressure value corresponding to '1010' is outputted from the MUX 220 and is identified as '5'. If the pressure generation units 341 and 342 are formed at 4 points, the pressure generation units 341 and 342 are sensed by the sensors 1 and 2, and corresponding current values are applied to the MUX 220, so that the pressure value corresponding to '1100' is outputted from the MUX 220 and is identified as '3'. Then, if only the pressure generation unit 341 is formed at 4 points, the pressure generation units 341 is sensed by the sensor 1, and corresponding current values are applied to the MUX 220, so that the pressure value corresponding to '1000' is outputted from the MUX 220 and is identified as '1'.

Thus, according to the formation position of the pressure generation unit 34, the position of the battery module 20 to be inserted into the battery module mounting part 50 can be easily identified.

Figure 6:
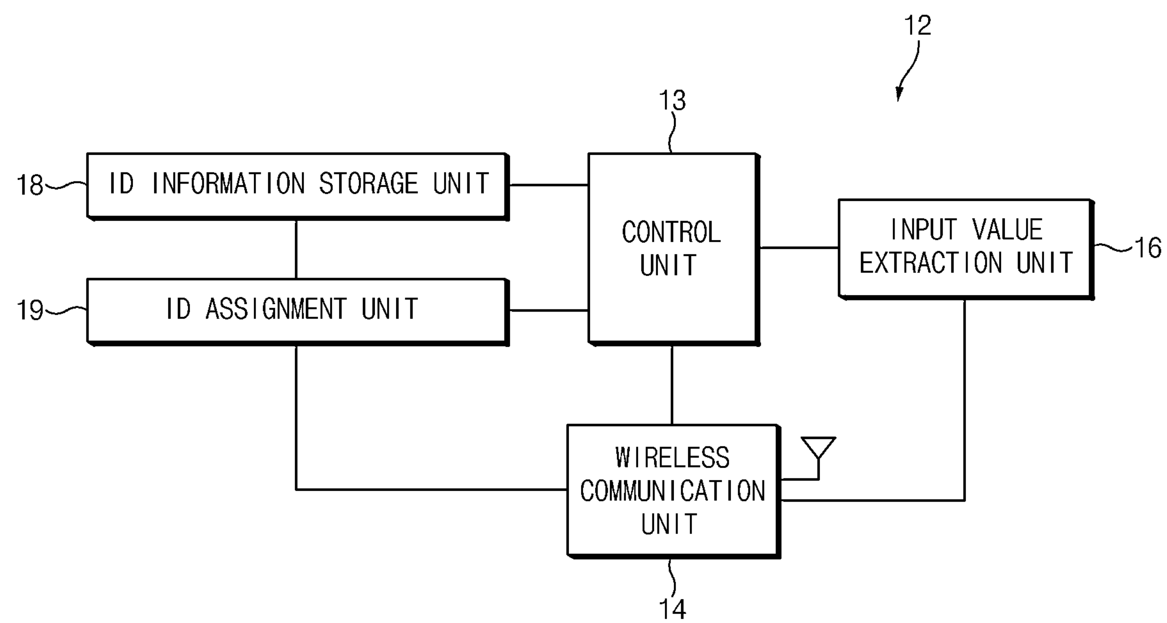
FIG. 6 is a main block diagram of an upper-level BMS according to an embodiment of the present invention.

Next, with reference to FIG. 6, the main configuration of the BMC 12 corresponding to the upper-level BMS according to an embodiment of the present invention will be described.

The BMC 12 according to an embodiment of the present invention includes a wireless communication unit 14 that communicates wirelessly with the CMC 22, a pressure value extraction unit 16 that extracts the pressure value from the pressure detection signal transmitted from the CMC 22 and transmits it to the control unit 13, an ID information storage unit 18 that stores a reference pressure value for identifying a battery module that is inserted and mounted in each battery module mounting parts 50 of a battery rack and automatically assigned ID information associated with the reference pressure value, a control unit 13 that queries the reference input value from the ID information storage unit 18 by using the pressure value extracted by the pressure value extraction unit 16 and searches for an ID stored in association with the reference input value and applies it to the ID assignment unit 19, and the ID assignment unit 19 that automatically assigns and registers an ID for the CMC 22 transmitting the pressure detection signal using the searched ID and transmits the automatically assigned ID to the CMC 22 through the wireless communication unit 14. In addition, the reference input value stored in the ID information storage unit 18 is stored in correspondence with each battery module mounting parts 50, and the reference input value is preferably determined in relation to the pressure generation unit 34 provided in each battery module mounting parts 50.

Figure 7:
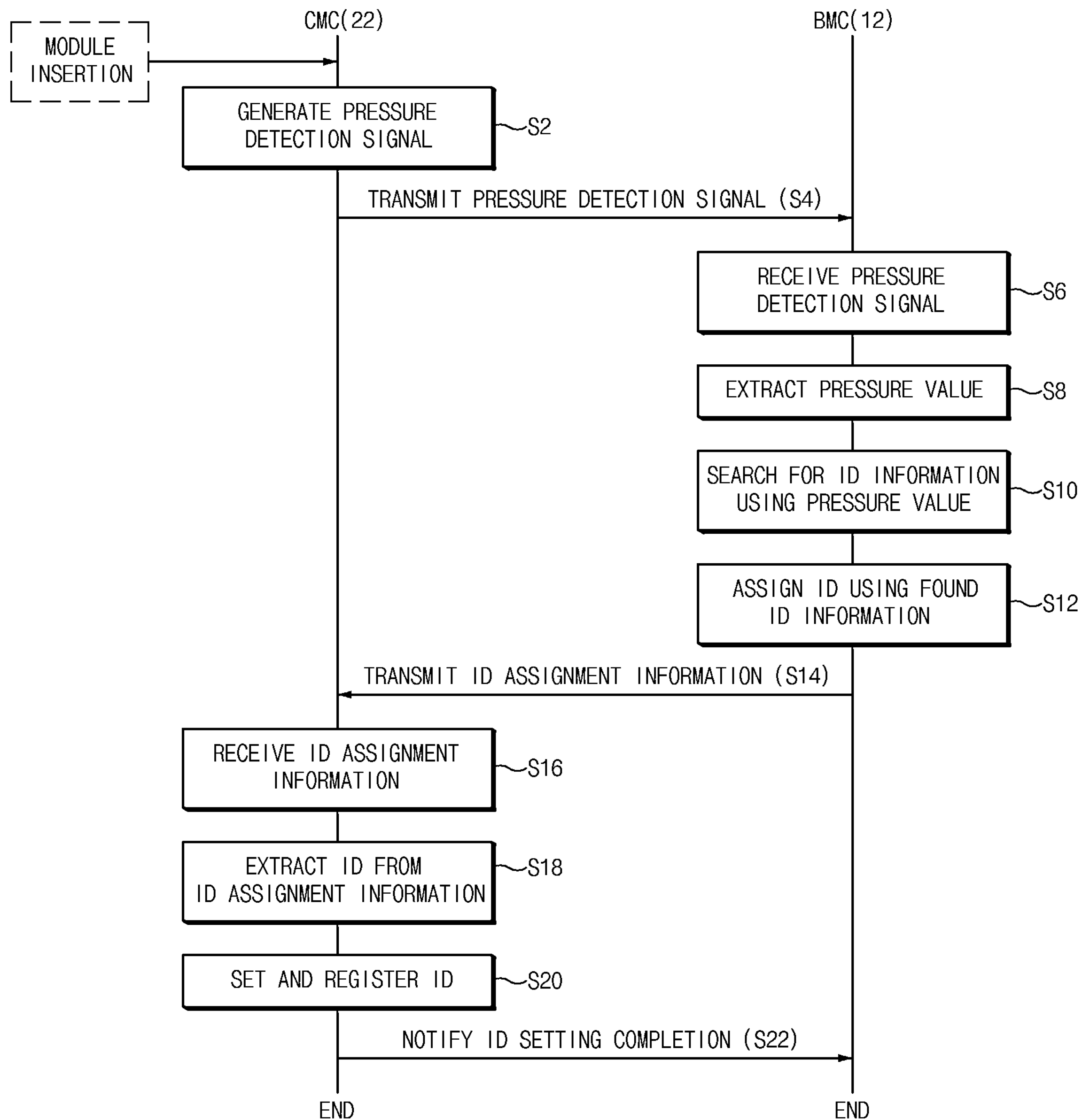
FIG. 7 is a flowchart illustrating an automatic ID allocation method of a battery module according to an embodiment of the present invention.

Hereinafter, an automatic ID assignment method of a battery module according to an embodiment of the present invention will be described with reference to the flowchart shown in FIG. 7.

When the battery module 20 is inserted into the battery module mounting parts 50 by an operator, in the sensor 23 of battery module 20, the resistance value is changed due to the pressure applied by the pressure generation unit 34, so that a pressure value corresponding to the pressure is generated, and the pressure value is transmitted to the control unit 24 of the CMC 22. The control unit 24 generates a pressure detection signal including the pressure value (S2), and transmits it to the BMC 12 through the wireless communication unit 21 (S4).

In the BMC 12, when the pressure detection signal is received through the wireless communication unit 14 (S6), the pressure value extraction unit 16 extracts the pressure value from the received pressure detection signal and transmits it to the control unit 13 (S8).

The control unit 13 searches for ID information from the ID information storage unit 18 using the extracted pressure value and transmits it to the ID assignment unit (S10). In operation S10, the control unit 13 searches for a reference pressure value corresponding to the extracted pressure value from the ID information storage unit 18, thereby searching for stored ID information associated with the reference pressure value.

Subsequently, the ID assignment unit 19 assigns the searched ID to the battery module 20 that has transmitted the corresponding pressure detection signal under the control of the control unit 13 (S12), and wirelessly transmits the ID assignment information to the battery module 20 through the wireless communication unit 14 (S14).

Subsequently, in the battery module 20, when ID assignment information is received through the wireless communication unit 21 (S16), after extracting the ID assigned to the battery module from the ID assignment information received by the ID storage unit 25 under the control of the CMC 22 (S18), the process of storing it in the ID storage unit 25 and registering and setting it as its own ID is completed (S20). The CMC 22 of the battery module 20 that has completed the above-described series of processes notifies the completion of ID setting to the BPU 10 and ends the automatic ID assignment procedure (S22).

In addition, the BMC 12 of the BPU 10 notified of the completion of ID setting transmitted from the battery module 20 also ends a series of automatic ID assignment procedures.

Figure 8:
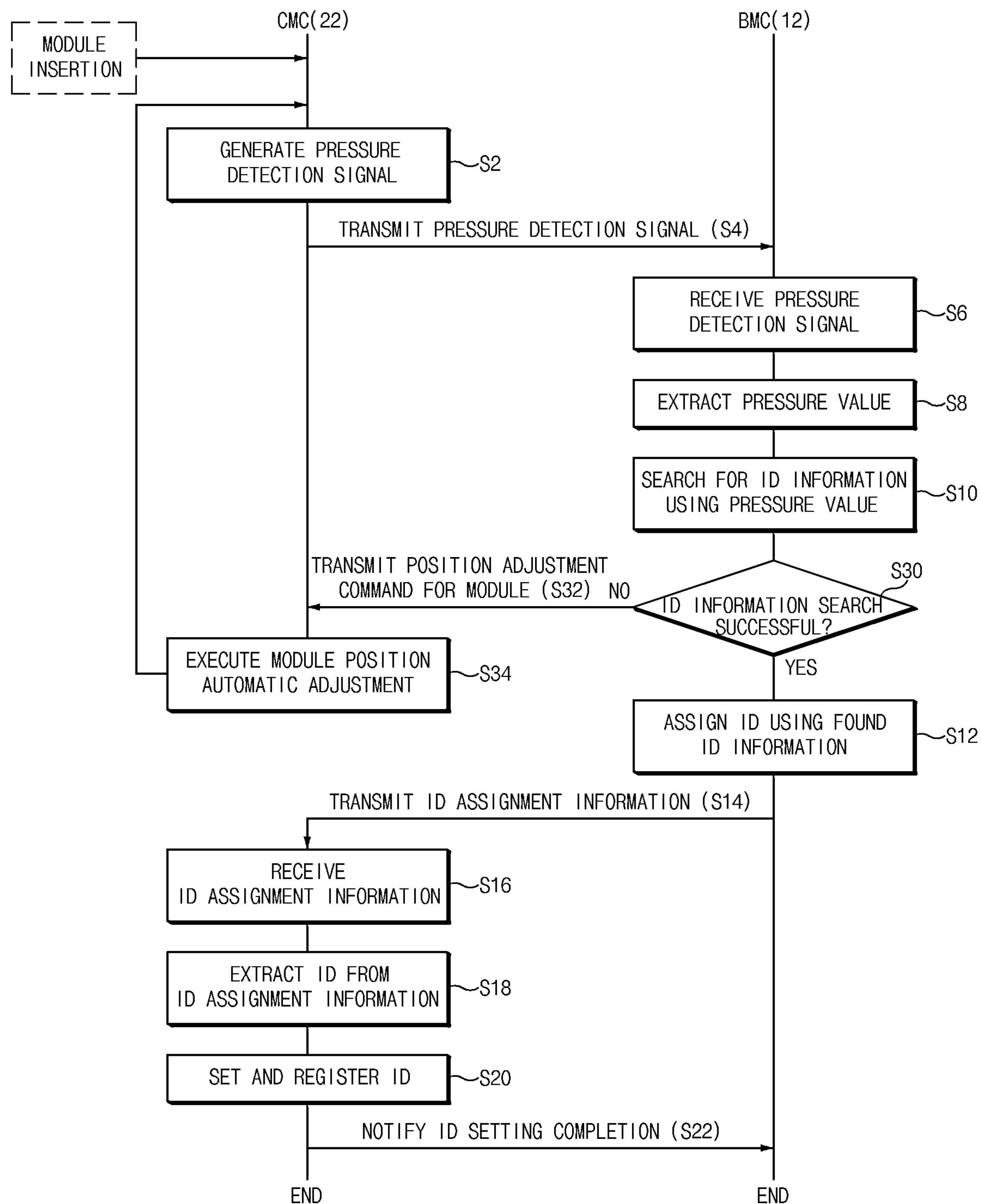
FIG. 8 is a flowchart illustrating an automatic ID allocation method of a battery module according to another embodiment of the present invention.

Hereinafter, an automatic ID allocation method of a battery module according to an embodiment of the present invention will be described with reference to the flowchart shown in FIG. 8.

When the battery module 20 is inserted into the battery module mounting parts 50 by an operator, in the sensor 23 of battery module 20, the resistance value is changed due to the pressure applied by the pressure generation unit 34, so that a pressure value corresponding to the pressure is generated, and the pressure value is transmitted to the control unit 24 of the CMC 22. The control unit 24 generates a pressure detection signal including a pressure value (S2). It is transmitted to the BMC 12 through the wireless communication unit 21 (S4).

In the BMC 12, when the pressure detection signal is received through the wireless communication unit 14 (S6), the pressure value extraction unit 16 extracts the pressure value from the received pressure detection signal and transmits it to the control unit 13 (S8).

The control unit 13 searches for the reference pressure value corresponding to the extracted pressure value from the ID information storage unit 18 to search for the stored ID information associated with the reference pressure value (S10). Subsequently, if the control unit 13 succeeds in retrieving the ID information (YES in S30), under the control of the control unit 13, the ID assignment unit 19 assigns the searched ID to the battery module 20 that has transmitted the corresponding pressure detection signal (S12), and then, wirelessly transmits ID assignment information to the battery module 20 through the wireless communication unit 14 (S14).

Subsequently, in the battery module 20, when ID allocation information is received through the wireless communication unit 21 (S16), after extracting the ID assigned to the battery module from the ID allocation information received by the ID storage unit 25 under the control of the CMC 22 (S18), the process of storing it in the ID storage unit 25 and registering and setting it as its own ID is completed (S20). The CMC 22 of the battery module 20 that has completed the above-described series of processes notifies the completion of ID setting to the BMC 12 and ends the automatic ID assignment procedure (S22).

In addition, the BMC 12 notified of the completion of ID setting transmitted from the battery module 20 also ends a series of automatic ID assignment procedures.

Meanwhile, as a result of searching for the reference pressure value from the ID information storage unit 18 using the extracted pressure value, if the search of the stored ID information associated with the reference pressure value fails (No in S30), the control unit 13 determines this as a module recognition failure, notifies the battery module 20 of the module recognition failure, and transmits a position adjustment command for the corresponding module (S32). Here, if the pressure value does not fall within a predetermined range of the reference pressure value, this may be determined as the module recognition failure.

The control unit 24 of the battery module receiving the position adjustment command from the BMC 12 controls the module position automatic adjustment unit 26 to adjust the position of the corresponding battery module 20 through the rail part 30 (S34), and then, proceeds to operation S2 and performs the process from operation S2 to operation S10 again. Optionally, the control unit 24 that has received the position adjustment command may alert the battery module 20 of the recognition failure through the notification unit 28.

In operation S30 to operation S34, the battery module whose position is automatically adjusted through operation S34 is moved to the correct position, and the pressure value detected by the pressure detection unit 230 falls within a predetermined range of the reference input value stored in the ID information storage unit 18, so that it is repeatedly performed until it is determined in S30 that the ID information search is successful.

Reference herein to 'one embodiment' of the principles of the present invention and various modifications of such expressions means that, in relation to this embodiment, the specific features, structures, characteristics, and the like are included in at least one embodiment of the principles of the present invention. Thus, the expression 'in one embodiment' and any other modifications disclosed throughout the specification are not necessarily all referring to the same embodiment.

All the embodiments and conditional examples disclosed in this specification are described to intend to help those skilled in the art to understand the principles and concepts of the present invention, so that it will be understood by those skilled in the art that various changes in form and details may be made therein without departing from the spirit and scope of the present invention. Therefore, the disclosed embodiments should be considered in descriptive sense only not in limited perspective sense. The scope of the invention is defined not by the detailed description of the invention but by the appended claims, and all differences within the scope will be construed as being included in the present invention.

The invention claimed is:

1. A battery module configured to wirelessly communicate with an upper-level battery management system (BMS) and be inserted into at least one battery module mounting part formed in a battery rack, the battery module comprising:

a pressure detection unit provided on a predetermined surface part of the battery module, the pressure detection unit being configured to:

detect a pressure applied to the predetermined surface part; and output a pressure value;

a wireless communication unit configured to transmit a pressure detection signal including the pressure value to the upper-level BMS through wireless communication; and a control unit configured to set and register a received identification (ID) information as the battery module's own ID when the ID information automatically assigned from the upper-level BMS is received.

2. The battery module of claim 1, wherein the pressure detection unit comprises a pressure sensor configured to output different pressure values according to an area to which pressure is applied.

3. The battery module of claim 1, wherein:

the pressure detection unit comprises a plurality of pressure sensing means configured to output pressure values for a plurality of points to which pressure is applied; and a signal processing unit configured to output a series of digital signals by muxing the outputs from the plurality of pressure sensing means.

4. The battery module of claim 2, wherein:

the predetermined surface part is configured to receive pressure from a pressure generation unit, provided corresponding to a portion where the predetermined surface part contacts the battery module mounting part, when the battery module is inserted and mounted in the battery module mounting part; and the pressure generation unit is provided with a different size or number for each of the battery module mounting part to apply a different pressure to each battery module.

5. The battery module of claim 4, wherein the predetermined surface part is a bottom part of the battery module.

6. An upper-level battery management system (BMS) that wirelessly communicates with at least one battery module mounted in a battery rack, the upper-level BMS comprising:

a control unit configured to:

identify a battery module that has transmitted a pressure detection signal including a pressure value; and automatically assign an identification (ID) to the identified battery module, based on a reference pressure value corresponding to a battery module mounting part into which each of the battery modules are inserted;

an ID information storage unit configured to store:

a reference pressure value for identifying the battery module; and

ID information that is automatically assigned in association with the reference pressure values; and an ID assignment information storage unit configured to store ID information that is automatically assigned to the battery module identified by the control unit.

7. The upper-level BMS of claim 6, wherein the control unit is further configured to:

identify the battery module based on the reference pressure value stored in the ID information storage unit; and according to a result of comparing the pressure value included in the pressure detection signal and the reference pressure value stored in the ID information storage unit, if the pressure value does not fall within a predetermined range of the reference pressure value:

determine that the identification of the battery module has failed; and notify the battery module of ID assignment failure.

8. The upper-level BMS of claim 6, wherein, when the identification of the battery module fails, the control unit is further configured to:

transmit a position adjustment command to the battery module; and terminate the ID assignment procedure for the battery module.

9. The upper-level BMS of claim 6, wherein:

the reference pressure value is a value corresponding to a reference value for pressure applied by a pressure generation unit provided in the battery module mounting part; and to identify the battery module inserted into the battery module mounting part, the reference value is a different value for each of the pressure generation units provided in the battery module mounting part.

10. An automatic identification (ID) assignment system of a battery module, comprising:

a battery module including:

a pressure detection unit provided on a predetermined surface part of a battery module, the pressure detection unit being configured to:

detect a pressure applied to the predetermined surface part; and output a pressure value;

a wireless communication unit configured to transmit a pressure detection signal, including the pressure value, to an upper-level battery management system (BMS) through wireless communication; and when ID information automatically assigned from the upper-level BMS is received, a first control unit configured to set and register the received ID information as the battery module's own ID, the first control unit being inserted into a battery module mounting part formed in at least one battery rack; and the upper-level BMS configured to wirelessly communicate with the battery module, the upper BMS including:

a second control unit configured to:

identify a battery module that has transmitted a pressure detection signal including a pressure value; and automatically assign an ID to the identified battery module, based on a reference pressure value corresponding to a battery module mounting part into which each of the battery modules are inserted;

an ID information storage unit configured to store:

a reference pressure value for identifying the battery module; and

ID information that is automatically assigned in association with the reference pressure values; and an ID assignment information storage unit configured to store ID information that is automatically assigned to the battery module identified by the second control unit.

11. The automatic ID assignment system of claim 10, wherein the pressure detection unit comprises a pressure sensor configured to output different pressure values according to an area to which pressure is applied.

12. The automatic ID assignment system of claim 10, wherein:

the pressure detection unit comprises a plurality of pressure sensing means configured to output pressure values for a plurality of points to which pressure is applied; and a signal processing unit configured to output a series of digital signals by muxing the outputs from the plurality of pressure sensing means.

13. The automatic ID assignment system of claim 11, wherein the predetermined surface part is configured to receive pressure from a pressure generation unit provided corresponding to a portion where the predetermined surface part contacts the battery module mounting part when the battery module is inserted and mounted in the battery module mounting part, the pressure generation unit being configured to output a pressure value corresponding to the portion.

14. The automatic ID assignment system of claim 10, wherein the second control unit is further configured to:

identify the battery module based on the reference pressure value stored in the ID information storage unit; and according to a result of comparing the pressure value included in the pressure detection signal and the reference pressure value stored in the ID information storage unit, if the pressure value does not fall within a predetermined range of the reference pressure value:

determine that the identification of the battery module has failed; and notify the battery module of ID assignment failure.

15. The automatic ID assignment system of claim 10, wherein, when the identification of the battery module fails, the second control unit is further configured to:

transmit a position adjustment command to the battery module; and terminate the ID assignment procedure for the battery module.

* * * * *